(12) United States Patent
Hattori et al.

(10) Patent No.: US 11,173,904 B2
(45) Date of Patent: Nov. 16, 2021

(54) TRAVEL CONTROL DEVICE

(71) Applicant: DENSO CORPORATION, Kariya (JP)

(72) Inventors: Shohei Hattori, Kariya (JP); Masashi Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 178 days.

(21) Appl. No.: 16/542,636

(22) Filed: Aug. 16, 2019

(65) Prior Publication Data
US 2019/0367026 A1 Dec. 5, 2019

Related U.S. Application Data

(63) Continuation of application No. PCT/JP2018/008620, filed on Mar. 6, 2018.

(30) Foreign Application Priority Data

Mar. 7, 2017 (JP) .............................. JP2017-042766

(51) Int. Cl.
*B60W 30/16* (2020.01)
*G05D 1/00* (2006.01)
(52) U.S. Cl.
CPC ............ *B60W 30/16* (2013.01); *G05D 1/0088* (2013.01); *B60W 2554/4041* (2020.02); *B60W 2554/801* (2020.02); *B60W 2554/804* (2020.02); *B60W 2720/106* (2013.01)
(58) Field of Classification Search
CPC ............ B60W 30/16; B60W 2554/801; B60W 2554/804; B60W 2554/4045; B60W 2720/106; B60W 60/00186; G05D 1/0088
See application file for complete search history.

(56) References Cited

U.S. PATENT DOCUMENTS

| 4,491,840 | A | * | 1/1985 | Nishikawa | B60Q 9/008 340/903 |
|---|---|---|---|---|---|
| 10,134,280 | B1 | * | 11/2018 | You | B60Q 1/34 |
| 2006/0167620 | A1 | * | 7/2006 | Takagi | G01C 21/3407 701/519 |
| 2013/0226433 | A1 | * | 8/2013 | Tominaga | B60W 50/0097 701/96 |
| 2016/0229395 | A1 | | 8/2016 | Schmudderich | |
| 2017/0154225 | A1 | * | 6/2017 | Stein | G06K 9/00798 |

(Continued)

FOREIGN PATENT DOCUMENTS

| JP | 2007176355 A | 7/2007 |
|---|---|---|
| JP | 2015044432 A | 3/2015 |

(Continued)

*Primary Examiner* — Michael J Zanelli
(74) *Attorney, Agent, or Firm* — Harness, Dickey & Pierce, P.L.C.

(57) ABSTRACT

The present disclosure provides a travel control device including: determining whether a lane change request from an adjacent vehicle for a lane change is detected; determining whether a safety condition is met with regard to an expected relationship between the adjacent vehicle and a subject vehicle; determining whether an acceptance condition is met; generating a target motion for the subject vehicle to allow the lane change by the adjacent vehicle to satisfy the safety condition; and executing a reception control that is a travel control of the automated driving in accordance with the target motion.

12 Claims, 5 Drawing Sheets

(56) References Cited

U.S. PATENT DOCUMENTS

| | | | |
|---|---|---|---|
| 2017/0349173 A1* | 12/2017 | Nishiguchi | B62D 15/0255 |
| 2017/0355368 A1* | 12/2017 | O'Dea | B60W 30/18163 |
| 2018/0068191 A1* | 3/2018 | Biemer | B60R 11/04 |
| 2018/0079419 A1 | 3/2018 | Yamamoto | |
| 2018/0326905 A1* | 11/2018 | Nakata | G08G 1/166 |

FOREIGN PATENT DOCUMENTS

| | | |
|---|---|---|
| JP | 2015063245 A | 4/2015 |
| JP | 2016145023 A | 8/2016 |
| JP | 2017030435 A | 2/2017 |
| WO | WO-2016147622 A1 | 9/2016 |

* cited by examiner

TRAVEL CONTROL DEVICE

CROSS REFERENCE TO RELATED APPLICATION

The present application is a continuation application of international Patent Application No. PCT/JP2018/008620 filed on Mar. 6, 2018, which designated the U.S. and claims the benefit of priority from Japanese Patent Application No. 2017-42766 filed on Mar. 7, 2017. The entire disclosures of all of the above applications are incorporated herein by reference.

TECHNICAL FIELD

The present disclosure relates to an automated driving technology for reacting to lane changes made by another vehicle.

BACKGROUND

There is a technique for recognizing a vehicle cutting in from an adjacent lane during automated driving and for setting a target speed such as to secure an appropriate inter-vehicle distance after the vehicle has cut in.

SUMMARY

The present disclosure provides a travel control device including: determining whether a lane change request from an adjacent vehicle for a lane change is detected; determining whether a safety condition is met with regard to an expected relationship between the adjacent vehicle and a subject vehicle; determining whether an acceptance condition is met; generating a target motion for the subject vehicle to allow the lane change by the adjacent vehicle to satisfy the safety condition; and executing a reception control that is a travel control of the automated driving in accordance with the target motion.

DETAILED DESCRIPTION

Figure 1:
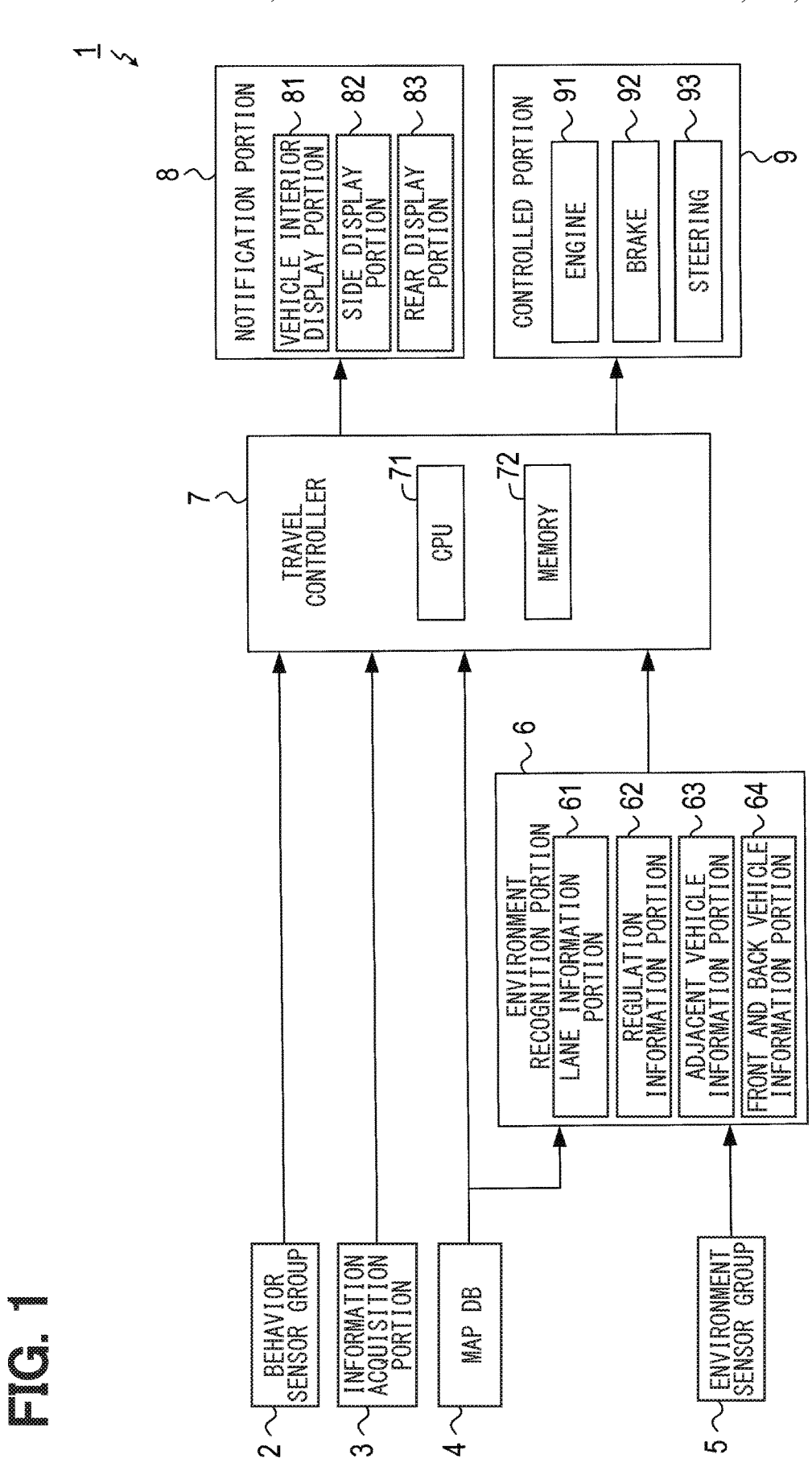
FIG. 1 is a block diagram illustrating a configuration of an automated driving system.

The inventors of this application have found, through close examination, that, while a conventional device can react to a vehicle starting to move laterally for cutting in, it cannot react to a vehicle that has not started a lateral movement yet.

Sharing various pieces of information via inter-vehicle communications to allow for a quick reaction would be one possibility. However, such a system would require that all vehicles be equipped with an inter-vehicle communication device and could not be applied in the current situation where there are mixed vehicles some of which are incommunicable.

The present disclosure may provide an automated driving technique that enables quick reactions to lane changes made by other vehicles without using inter-vehicle communications.

According to one aspect of the present disclosure, a travel control device may include a request detection portion, a calculation and determination portion, an acceptance determination portion, a target generation portion, and a controller.

The request detection portion may determine whether a lane change request from an adjacent vehicle for a lane change to an own lane is detected based on an illumination state of at least one of a directional indicator or a hazard light of the adjacent vehicle.

The calculation and determination portion may determine, in response to that the request detection portion detects the lane change request, whether a safety condition is met with regard to an expected relationship between the adjacent vehicle and a subject vehicle when the adjacent vehicle completes the lane change. The safety condition is predetermined to avoid causing both drivers of the adjacent vehicle and the subject vehicle to feel danger.

The acceptance determination portion may determine whether an acceptance condition is met, in response to that the calculation and determination portion determines that the safety condition is hardly met, the acceptance condition at least including existence of an acceptance space between a vehicle traveling ahead of the subject vehicle or a vehicle traveling behind the subject vehicle and the subject vehicle.

The target generation portion may generate a target motion for the subject vehicle to allow the lane change by the adjacent vehicle to satisfy the safety condition, in response to that the acceptance determination portion determines that the acceptance condition is met.

The controller may execute a reception control that is a travel control of the automated driving in accordance with the target motion generated by the target generation portion.

Incidentally, the subject vehicle is a vehicle equipped with the travel control device. The own lane is a lane on which the subject vehicle is travelling. The adjacent vehicle is a vehicle traveling on an adjacent lane that is a lane adjacent to the own lane. The acceptance space is a space necessary for executing the reception control without causing drivers of the vehicle traveling ahead, the vehicle traveling behind, and the subject vehicle to feel danger.

According to this configuration, the system starts to react in response to a lane change request from an adjacent vehicle indicated with a directional indicator or hazard light rather than a movement of the vehicle involved in changing lanes such as a lateral movement. Therefore, a quick reaction is possible in response to lane changes of other vehicles even when inter-vehicle communication is unavailable. Accordingly, since the system can react in good time, the lane change can be carried out safely and smoothly. Moreover, the reception control that is performed when acceptance conditions are met allows the adjacent vehicle to change lanes without causing the drivers of the vehicles ahead and behind to feel danger.

Hereinafter, embodiments of the present disclosure will be described with reference to the drawings.

(Configuration)

An automated driving system 1 shown in FIG. 1 is mounted on a vehicle and realizes automated driving in which control of a travel along a set route is executed automatically. A vehicle equipped with the automated driving system 1 will be referred to as a "subject vehicle".

The automated driving system 1 includes a travel controller 7. The travel controller 7 corresponds to a travel control device. The automated driving system 1 may further include a behavior sensor group 2, an information acquisition portion 3, a map database (hereinafter map DB) 4, an environment sensor group 5, an environment recognition portion 6, a notification portion 8, and a controlled portion 9.

The behavior sensor group 2 is one or more sensors provided for detecting behaviors of the subject vehicle. The behavior sensor group 2 detects, for example, the speed, acceleration, yaw rate, steering angle, and so on of the subject vehicle.

The information acquisition portion 3 acquires various pieces of traffic information including restriction information of the road on which the vehicle is traveling, utilizing a system that uses road-to-vehicle communication such as VICS, for example. The restriction information may include information on lane restrictions due to an accident, construction, or the like, for example. VICS is a registered trademark and stands for Vehicle Information and Communication System.

The map DB 4 stores at least a high-precision map for automated driving. The high-precision map contains information on whether overtaking is allowed, and traffic rules such as speed limits.

The environment sensor group 5 includes at least one of cameras and radar sensors disposed in the front and the back and on the left and right of the subject vehicle. The environment sensor group 5 detects information on various objects including other vehicles present in surrounding areas of the subject vehicle. The environment sensor group 5 may detect partition lines, marks, and the like drawn on the road surface. At least one of milliwave radars, laser radars, and ultrasonic radars may be used, for example, as the radar sensor.

The environment recognition portion 6 recognizes the surrounding environment of the subject vehicle using the information on the surroundings of the subject vehicle position acquired from the map DB 4 (hereinafter, map information) and the results of analysis or the like of at least one of images and detection signals obtained from the environment sensor group 5 (hereinafter, images and the like). The environment recognition portion 6 includes a lane information portion 61, a regulation information portion 62, an adjacent vehicle information portion 63, and a front and back vehicle information portion 64.

The lane information portion 61 recognizes partition lines drawn on the road surface based on the images and the like and identifies an own lane on which the subject vehicle is traveling and an adjacent lane or the like adjoining the own lane.

The regulation information portion 62 recognizes a traffic regulation in relation to the road on which the subject vehicle is traveling based on at least one of the map information and the results of analysis of images and the like. The traffic regulations recognized by the regulation information portion 62 may include, for example, at least one of a speed limit, and whether overtaking is allowed.

The adjacent vehicle information portion 63 recognizes information in relation to an adjacent vehicle, which is a vehicle traveling on the adjacent lane identified by the lane information portion 61, based on images and the like. Here, a vehicle located closest to the subject vehicle within a preset range in the front and the back of the subject vehicle is determined as an adjacent vehicle. The information recognized by the adjacent vehicle information portion 63 may include a relative distance and a relative velocity between the subject vehicle and the adjacent vehicle, and an illumination state of a directional indicator or a hazard light of the adjacent vehicle. The illumination state may include, in addition to whether the directional indicator or hazard light is blinking, the duration of time after the light has started blinking.

The front and back vehicle information portion 64 recognizes information in relation to a vehicle in the front traveling ahead of the subject vehicle and a vehicle in the back traveling behind the subject vehicle, both traveling on own lane identified by the lane information portion 61, based on images and the like. Here, a vehicle located closest to the subject vehicle within a preset range in the front and the back of the subject vehicle is determined as a vehicle in the front or a vehicle in the back. The information recognized by the front and back vehicle information portion 64 may include a relative distance and a relative velocity between the subject vehicle and the vehicle in the front, and a relative distance and a relative velocity between the subject vehicle and the vehicle in the back.

The notification portion 8 indicates execution of a reception control for accepting a lane change request from the adjacent vehicle in accordance with an instruction from the travel controller 7. The notification portion 8 includes a vehicle interior display portion 81, a side display portion 82, and a rear display portion 83. The vehicle interior display portion 81 is located at a position visible from the driver of the subject vehicle. The side display portion 82 is placed on both left and right sides of the subject vehicle, with the display surface facing outward so that the adjacent vehicle's driver can visually recognize it. The rear display portion 83 is placed in the back of the subject vehicle, with the display surface facing outward so that the driver of the vehicle behind can visually recognize it.

The controlled portion 9 controls the traveling conditions of the subject vehicle by controlling at least one of an engine 91, a brake 92, and a steering 93 in accordance with instructions from the travel controller 7.

The travel controller 7 includes a microcomputer having a CPU 71, and a semiconductor memory (hereinafter a memory 72) such as a RAM, ROM, flash memory, or the like. Various functions of the travel controller 7 are realized by the CPU 71 executing a program stored in a non-transitory tangible recording medium. Here, the memory 72 corresponds to the non-transitory tangible recording medium that stores programs. As the program is executed, the method corresponding to the program is carried out. The travel controller 7 may include one microcomputer, or multiple microcomputers.

The travel controller 7 realizes an automated driving process, with the CPU 71 executing a program. The automated driving process sets a route to a destination, and executes a travel control in accordance with the set route and surrounding situations. The method of realizing the functions of the travel controller 7 is not limited to software. Some or all the elements may be realized using one or multiple hardware. For example, one of the features described above may be realized by an electronic circuit which is a type of hardware, and this electronic circuit may be configured by a digital circuit, or an analog circuit, or a combination of these.

(Process)

Figure 2:
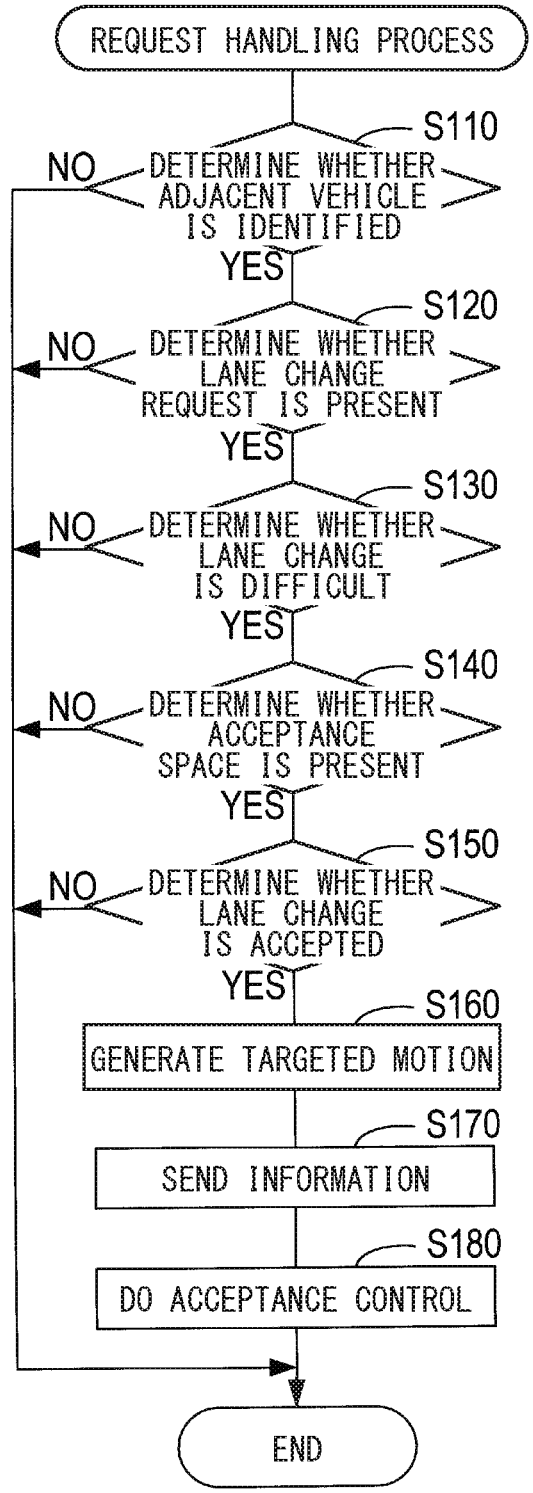
FIG. 2 is a flowchart of a request handling process.

Next, a request handling process for responding to a lane change request from an adjacent vehicle, which is part of the automated driving process executed by the travel controller 7, will be described with reference to the flowchart of FIG. 2.

This process is repeated in a regular cycle.

When the process is started, the travel controller 7 determines whether there exists an adjacent vehicle based on the results of recognition by the adjacent vehicle information portion 63 at S110. The process by the travel controller 7 proceeds to S120 if there is an adjacent vehicle, and ends if there is no adjacent vehicle.

At S120, the travel controller 7 determines whether a lane change request from an adjacent vehicle has been detected based on the results of recognition by the adjacent vehicle information portion 63. More specifically, if one of the directional indicators of an adjacent vehicle on the side facing own lane is blinking, or if the hazard light is blinking, the travel controller 7 determines that a lane change request has been detected. The process by the travel controller 7 proceeds to S130 if the lane change request has been detected, and ends if the lane change request has not been detected.

At S130, the travel controller 7 determines whether it is difficult for the adjacent vehicle to change lanes to own lane based on the detection results of the behavior sensor group 2 and the results of recognition by the adjacent vehicle information portion 63. More specifically, the travel controller 7 determines that the lane change is difficult if both of formula (1) and formula (2) are satisfied.

$$x_r + v_r \cdot t < X_\alpha \qquad (1)$$

$$|v_r| < V_\alpha \qquad (2)$$

Figure 3:
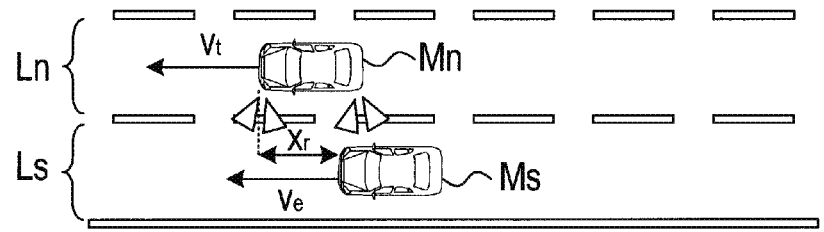
FIG. 3 is an illustrative diagram showing the relative relationship between the subject vehicle and an adjacent vehicle.
Figure 4:
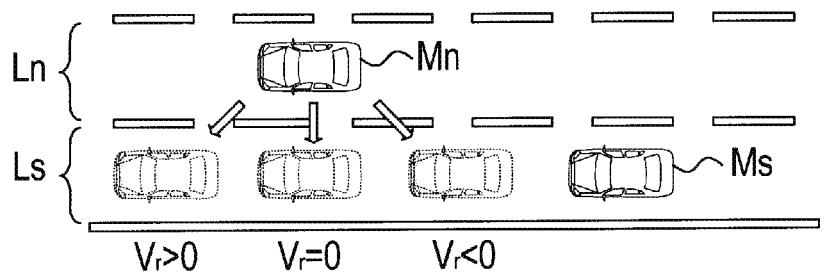
FIG. 4 is an illustrative diagram showing the positional relationship between the adjacent vehicle and the subject vehicle for each relative velocity after a lane change.

Here, xr represents a relative distance between the subject vehicle Ms and an adjacent vehicle Mn, as shown in FIG. 3. vr denotes a relative velocity between the subject vehicle Ms and the adjacent vehicle Mn, positive values indicating the distance increasing, and negative values indicating the distance decreasing. In FIG. 3, Ls denotes the own lane, and Ln denotes the adjacent lane. When the adjacent vehicle Mn is positioned ahead of the subject vehicle Ms, yr=vt−ve, where ve is the speed of the subject vehicle Ms, and vt is the speed of the adjacent vehicle Mn. When the adjacent vehicle Mn is positioned behind the subject vehicle Ms, yr=ve−vt. t represents a standard time required for the adjacent vehicle Mn from the time of start until completion of a lane change. The right-hand side of the formula (1) represents an expected value of relative distance between the subject vehicle Ms and the adjacent vehicle Mn at the end of the lane change provided that the relative velocity yr between the subject vehicle Ms and the adjacent vehicle Mn is maintained constant during the lane change. As shown in FIG. 4, the relative distance after the lane change remains xr if yr=0, larger than xr if vr>0, and smaller than xr if yr<0. While FIG. 4 shows a case where the adjacent vehicle Mn is ahead of the subject vehicle Ms, the same applies to the case where the adjacent vehicle Mn is behind the subject vehicle Ms except that the positional relationship between the adjacent vehicle Mn and the subject vehicle Ms after the lane change is inverted. A distance threshold Xa and an adjacent vehicle speed threshold Va are experimentally determined to such values as not to cause both drivers of the subject vehicle Ms and the adjacent vehicle Mn to feel danger at the end of the lane change. Hereinafter, a condition that denies formula (1) and formula (2) will be referred to as "safety condition". In other words, S130 determines whether the safety condition is met.

When the travel controller 7 determines that a lane change will be difficult, i.e., that the safety condition is not met, at S130, the process proceeds to S140. When the controller determines that a lane change will not be difficult, i.e., that the safety condition is met, this process ends.

At S140, the travel controller 7 determines whether there exists an acceptance space in the front or in the back of the subject vehicle, and whether the relative velocity of the vehicle positioned in the front or in the back over the acceptance space is not less than a predetermined front-and-back vehicle speed threshold Vβ, based on the detection results of the behavior sensor group 2 and the results of recognition by the front and back vehicle information portion 64. The condition based on which this determination is made is one of acceptance conditions. More specifically, the travel controller 7 determines which to let the adjacent vehicle cut in front of the subject vehicle or behind based on the positional relationship or the like between the subject vehicle and the adjacent vehicle. This determination is made suitably based on the positional relationship and relative velocity between the subject vehicle and the adjacent vehicle in comparison to conditions that are experimentally determined in advance, for example. To let the adjacent vehicle cut in front of the subject vehicle, the travel controller 7 determines whether there exists an acceptance space behind the subject vehicle, and whether the relative velocity between the subject vehicle and the vehicle behind equals to or more than the front-and-back vehicle speed threshold Vα. To let the adjacent vehicle merge behind the subject vehicle, the travel controller 7 determines whether there exists an acceptance space in front of the subject vehicle, and whether the relative velocity between the subject vehicle and the vehicle ahead equals to or more than the front-and-back vehicle speed threshold Vβ.

Figure 5:
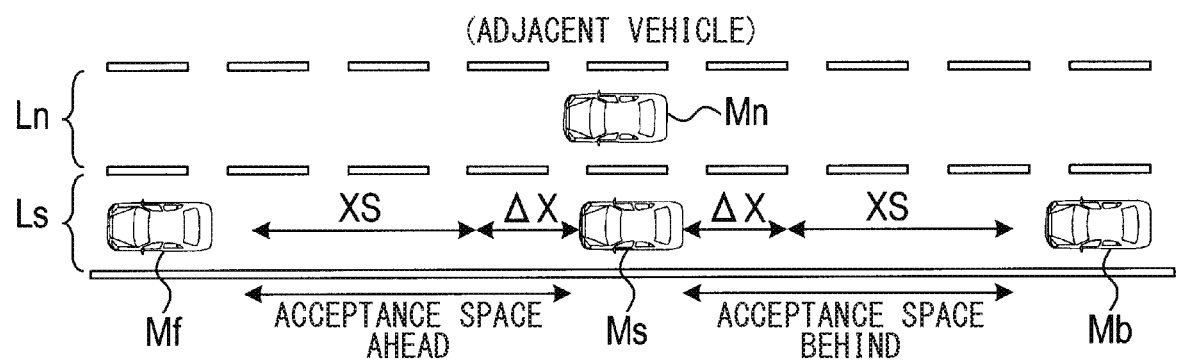
FIG. 5 is an illustrative diagram about an acceptance space in the front and the back of the subject vehicle.

As shown in FIG. 5, when there is an inter-vehicle distance of not less than ΔX+XS, which is a sum of the variation ΔX in the inter-vehicle distance that varies as the reception control is executed and a safe inter-vehicle distance XS, between the vehicle behind Mb or the vehicle ahead Mf and the subject vehicle, the travel controller 7 determines that there exists an acceptance space. The front-and-back vehicle speed threshold Vβ is set to a relative velocity that does not cause the driver to feel danger when the inter-vehicle distance is XS. ΔX may be a fixed value, or a variable determined from the conditions of the subject vehicle Ms, the vehicle ahead Mf, and the vehicle behind Mb. If ΔX is a fixed value, it may be the distance corresponding to the space for one vehicle, for example.

When the travel controller 7 determines that there exists an acceptance space at S140, the process proceeds to S150. When the controller determines that there is no acceptance space, this process ends.

At S150, the travel controller 7 determines whether the current situation satisfies the predetermined acceptance condition based on the detection results of the behavior sensor group 2, information acquired by the information acquisition portion 3, map information acquired from the map DB 4, and the results of recognition by the environment recognition portion 6. The condition mentioned above in relation to S130 is excluded from the acceptance condition in this step.

The acceptance condition at least includes the directional indicator of the adjacent vehicle blinking continually for a predetermined duration of time or longer. The acceptance condition may differ depending on the combination of the traveling status of the subject vehicle and the position of the moving space for moving in. The traveling status of the subject vehicle refers to one of traveling at a constant speed, decelerating, and accelerating. The position of the moving space refers to one of the front or the back of the subject vehicle. For example, if the subject vehicle is decelerating, the acceptance condition may be the existence of an acceptance space behind in order to let the adjacent vehicle cut in front of the subject vehicle. Or, if the subject vehicle is accelerating, the acceptance condition may be the existence of an acceptance space ahead in order to let the adjacent vehicle merge behind the subject vehicle. Alternatively, it may be determined that the acceptance condition is not met if overtaking including a lane change is prohibited by an identified traffic regulation.

The following cases may be regarded as a high priority request for a lane change, and result in an immediate determination that the acceptance condition is met. The high priority request case may include, for example, a blinking hazard light. The high priority request case may include a branching road or an exit road branching off ahead in own lane on the side opposite from the adjacent lane on which the adjacent vehicle is present. The high priority request case may include a restriction ahead in the adjacent lane due to an accident or construction. The high priority request case may include the adjacent lane ending ahead because of merging roads or a lane reduction ahead.

When the travel controller 7 determines that the acceptance condition is met at S150, the process proceeds to S160. When the controller determines that the acceptance condition is not met, this process ends.

At S160, the travel controller 7 generates a target trajectory that is a target motion for giving way to the adjacent vehicle based on the detection results of the behavior sensor group 2 and the results of recognition by the environment recognition portion 6, and the process proceeds to S170. The target trajectory is profile data of target positions for each constant distance in correspondence with target speeds at these target positions. The target trajectory is generated in consideration of applicable traffic rules to be abided by, as well as the safety condition being met as described above in association with S130 regarding the conditions of both vehicles after the lane change. The traffic rules may include, for example, at least one of not speeding up to a speed limit or higher, and not speeding down to a speed limit or lower. The safety condition requirement may be eased to generate the target trajectory when the request has a high priority.

At S170, the travel controller 7 notifies the drivers of the subject vehicle, adjacent vehicle, and the vehicle behind, by way of the notification portion 8, of the intention to perform a reception control that is the control for giving way to the adjacent vehicle in accordance with the target motion set at S160, and the process proceeds to S180. For example, the driver of the subject vehicle is informed of deceleration or acceleration for giving way, by way of the vehicle interior display portion 81. The driver of the adjacent vehicle is notified of the intention of giving way, and prompted to cut in front of the subject vehicle or merge behind the subject vehicle, by way of the side display portion 82. The driver of the vehicle behind is informed of deceleration or acceleration for giving way to the adjacent vehicle, by way of the rear display portion 83.

At S180, the travel controller 7 executes the reception control and this process ends. More specifically, the travel controller 7 transmits various commands to the controlled portion 9 as required to realize the automated traveling along the target route.

S120 corresponds to a request detection portion. S130 corresponds to a calculation and determination portion. S140 and S150 correspond to an acceptance determination portion. S160 corresponds to a target generation portion. S170 corresponds to a notification portion. S180 corresponds to a controller.

Operation Example

Figure 6:
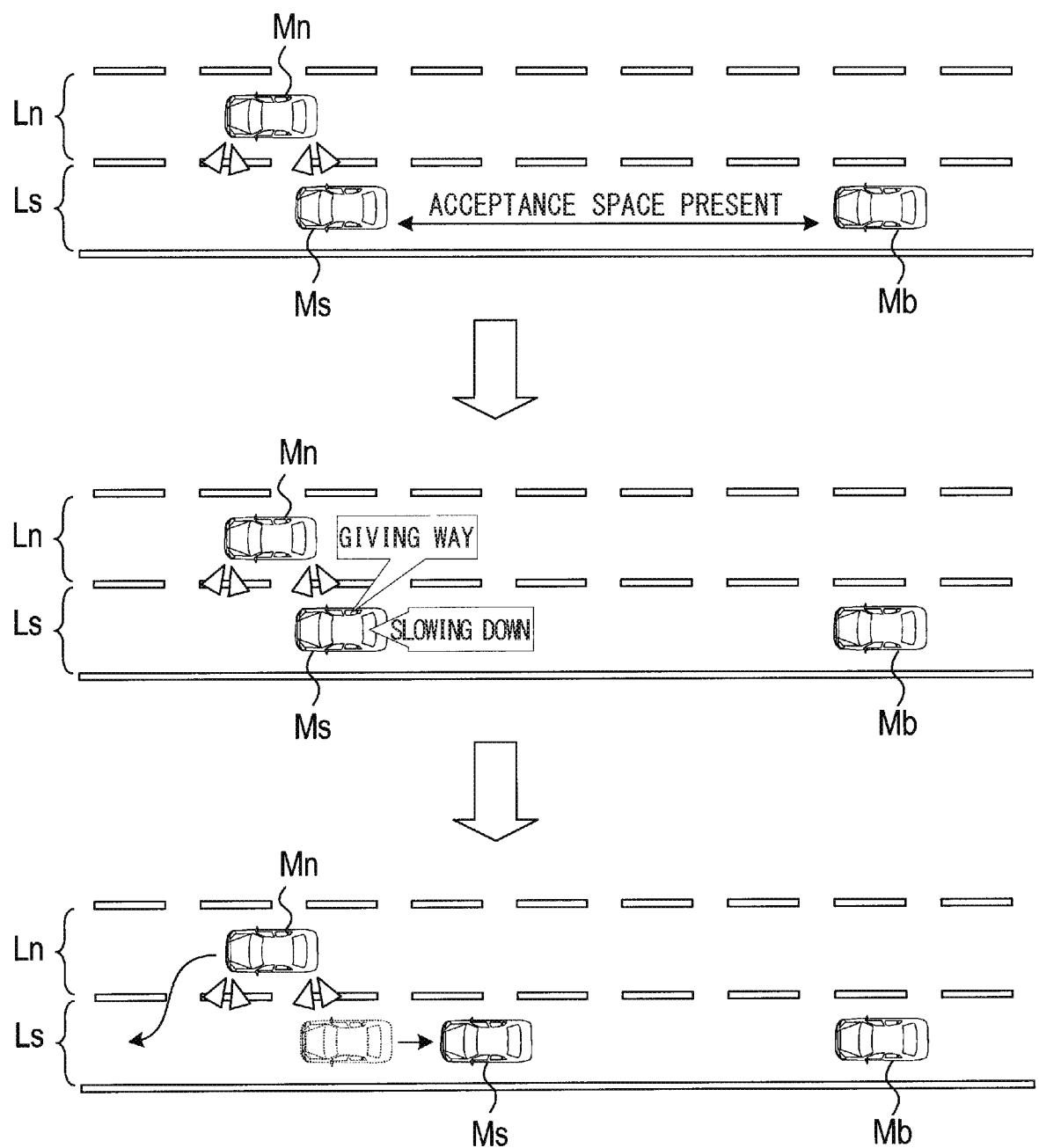
FIG. 6 is an illustrative diagram showing a series of actions to reduce speed to create a space in front of the subject vehicle, in which the adjacent vehicle cuts.

When letting the adjacent vehicle Mn cut in front of the subject vehicle Ms, the automated driving system 1 checks if there is enough acceptance space behind the subject vehicle Ms, which is sufficient for the vehicle behind Mb not to feel danger even if the subject vehicle Ms slows down, as shown in FIG. 6. After that, the automated driving system 1 sends a message to the adjacent vehicle Mn such as "giving way" etc., sends a message to the vehicle behind Mb such as "slowing down" etc., and starts the reception control. Here, the system executes control for slowing down the subject vehicle Ms to create a space ahead of the subject vehicle Ms, into which the adjacent vehicle Mn moves, as a reception control.

Figure 7:
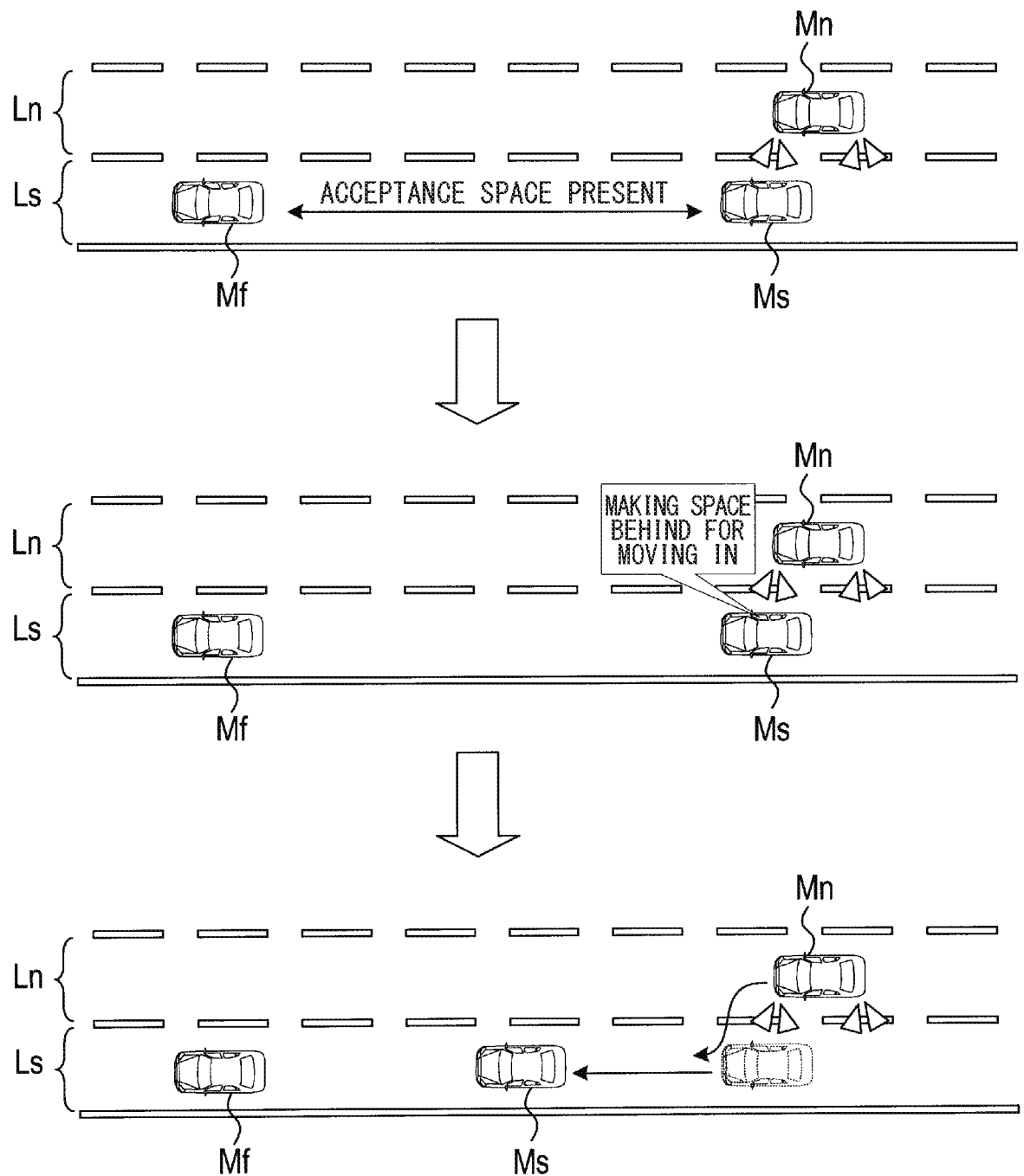
FIG. 7 is an illustrative diagram showing a series of actions to increase speed to create a space behind the subject vehicle, into which the adjacent vehicle moves.

When letting the adjacent vehicle Mn merge behind the subject vehicle Ms, the automated driving system 1 checks if there is enough acceptance space ahead of the subject vehicle Ms, which is sufficient for the vehicle ahead Mf not to feel danger even if the subject vehicle Ms speeds up, as shown in FIG. 7. After that, the automated driving system 1 sends a message to the adjacent vehicle Mn such as "making a moving space behind" etc., and starts the reception control. Here, the system executes control for speeding up the subject vehicle Ms to create a space behind the subject vehicle Ms, into which the adjacent vehicle Mn moves, as a reception control.

The first embodiment described above in detail provides the following effects, for example.

The automated driving system 1 detects a lane change request indicated with a directional indicator or hazard light rather than a movement of the adjacent vehicle involved in changing lanes such as a lateral movement and reacts to the lane change request. Therefore, the automated driving system 1 can react quickly to lane changes of other vehicles without requiring inter-vehicle communication. Accordingly, since the system can react in good time, the lane change can be carried out safely and smoothly.

Even when the adjacent vehicle and the subject vehicle are positioned relative to each other such that a safe lane change can hardly be made, the automated driving system 1 executes a reception control for accepting the request for a lane change from the adjacent vehicle as long as there is enough acceptance space ahead of or behind the subject vehicle. Therefore, the automated driving system 1 can create a space into which the adjacent vehicle moves without causing the driver of the vehicle ahead or the vehicle behind to feel danger, even if the subject vehicle speeds up or slows down because of the reception control.

The automated driving system 1 notifies the drivers of the subject vehicle, adjacent vehicle, and the vehicle behind of the intention to execute a reception control before carrying it out. Therefore, the drivers of the adjacent vehicle and the vehicle behind can predict the behavior of the subject vehicle and react to an actual movement of the subject vehicle in good time.

The automated driving system 1 uses a fact that the adjacent vehicle keeps requesting a lane change for a preset time or longer as one acceptance condition, so that the reception control is prevented from being started in response to an accidental operation of the directional indicator. The automated driving system 1 is likely to start reacting to the lane change request after the preset time after the adjacent vehicle has shown the lane change request. Therefore, the automated driving system 1 can avoid giving a wrong impression to the driver of the adjacent vehicle of being unkind and ignoring the intentions of other drivers.

The automated driving system 1 determines that the priority level of the lane change request is high when the adjacent vehicle is blinking the hazard light and executes a reception control, so that an unpredictable danger due to an emergency can be avoided. That is, if a vehicle is blinking a hazard light, there is a high possibility of an emergency, such as the vehicle having broken down or the driver being not well, so that it is desirable to give way immediately. The adjacent vehicle blinking its hazard light may make a dangerous move such as suddenly coming to a standstill. The reception control therefore may be executed such that there will be a larger inter-vehicle distance than usual after the lane change between the subject vehicle and the adjacent vehicle that has cut in.

The automated driving system 1 determines that the priority level of the lane change request is high when there is a branching road ahead in own lane and executes a reception control. Namely, the lane change request in this case is assumed to be the intention of entering the branching road ahead, so that it is desirable to make it easier for the adjacent vehicle to do so. The automated driving system 1 also determines that the priority level of the lane change request is high and executes a reception control, when there is a restriction ahead in the adjacent lane due to an accident or construction, or when the adjacent lane ends ahead due to merging roads or a lane reduction. Namely, the lane change request in this case is assumed to be the intention of avoiding the lane that ends ahead due to a restriction or road design, so that it is desirable to make it easier for the adjacent vehicle to do so.

OTHER EMBODIMENTS

While one embodiment of the present disclosure has been described above, the present disclosure is not limited to the embodiment described above and can be carried out with various modifications.

(a) The target trajectory is generated in consideration of applicable traffic rules to be abided by, as well as the safety condition being met regarding the status of both vehicles after the lane change in the embodiment described above, but the present disclosure is not limited to this example. For example, the target trajectory may be generated in accordance with the results of risk evaluation based on the surrounding situations.

(b) Whether the vehicle is traveling at a constant speed, or accelerating, or decelerating is considered as the status of vehicles to be considered when generating the target trajectory in the embodiment described above, but the present disclosure is not limited to this example. For example, the steering condition may further be considered as the vehicle status when generating the target trajectory.

(c) In the embodiment described above, the system decides which to let the adjacent vehicle move to the front or the back of the subject vehicle based on a relationship between the subject vehicle and the adjacent vehicle relative to each other, and generates one target trajectory in accordance with the decision, but the present disclosure is not limited to this example. For example, a target trajectory may be generated for both cases of letting the adjacent vehicle move to the front of the subject vehicle and letting it move to the back of the subject vehicle, and one of the target trajectories may be selected based on a comparison between the contents of the control required for realizing these target trajectories.

(d) The embodiment described above uses a notification portion 8 that can display characters, but the present disclosure is not limited to this example. For example, various existing HMI devices or illumination devices may be used as the notification portion 8, to inform drivers using not only characters but also an illumination pattern and the like. The driver of the subject vehicle, in particular, may be informed with a voice.

(e) The embodiment described above uses information that can be acquired without using inter-vehicle communication as the acceptance condition. If inter-vehicle communication is available, one of the following information being available by the inter-vehicle communication may be used as the acceptance condition. For example, that the navigation system of the adjacent vehicle is requesting an exit at the next branching road may be used as one acceptance condition. That the amount of remaining fuel or remaining travel distance of the adjacent vehicle is not more than a certain value may be used as one acceptance condition. That the adjacent vehicle is in a fail-safe mode, i.e., traveling in its safety mode due to a breakdown or abnormality may be used as one acceptance condition. That the driver of the adjacent vehicle is unwell may be used as one acceptance condition.

(f) Multiple functions of one element in the above embodiment may be implemented by multiple elements, or one function of one element may be implemented by multiple elements. Further, multiple functions of multiple elements may be implemented by one element, or one function implemented by multiple elements may be implemented by one element. A part of the configuration of the above embodiment may be omitted. At least a part of the configuration of the above embodiment may be added to or replaced with another configuration of the above embodiment. All modes included in the technical idea identified by the wording described in the claims correspond to embodiments of the present disclosure.

(g) In addition to the above described travel control device, that is, the travel controller 7, the present disclosure can be realized in various forms including a system including the travel control device as a component, a program for causing a computer to function as the travel control device, a non-transitory tangible recording medium such as a semiconductor memory storing the program, a method for reacting to a lane change request.

What is claimed is:

1. A travel control device that executes automated driving, comprising:
    a request detection portion that is configured to determine a lane change request from an adjacent vehicle for a lane change to an own lane is detected when an illumination state of at least one of a directional indicator or a hazard light of the adjacent vehicle continues for a predetermined duration of time or longer;
    a calculation and determination portion that is configured to determine, in response to that the request detection portion detects the lane change request, whether a safety condition is met with regard to an expected relationship between the adjacent vehicle and a subject vehicle when the adjacent vehicle completes the lane change, the safety condition being predetermined to avoid causing both drivers of the adjacent vehicle and the subject vehicle to feel danger;

an acceptance determination portion that is configured to determine whether an acceptance condition is met, in response to that the calculation and determination portion determines that the safety condition is hardly met, the acceptance condition at least including existence of an acceptance space between a vehicle traveling ahead of the subject vehicle or a vehicle traveling behind the subject vehicle and the subject vehicle;

a target generation portion that is configured to generate a target motion for the subject vehicle to allow the lane change by the adjacent vehicle to satisfy the safety condition, in response to that the acceptance determination portion determines that the acceptance condition is met; and a controller that is configured to execute a reception control that is a travel control of the automated driving in accordance with the target motion generated by the target generation portion, wherein:

the subject vehicle is a vehicle equipped with the travel control device;

the own lane is a lane on which the subject vehicle is travelling;

the adjacent vehicle is a vehicle traveling on an adjacent lane that is a lane adjacent to the own lane; and the acceptance space is a space necessary for executing the reception control without causing drivers of the vehicle traveling ahead, the vehicle traveling behind, and the subject vehicle to feel danger.

2. The travel control device according to claim 1, wherein:
the calculation and determination portion is configured to use at least one of a fact that an expected inter-vehicle distance between the adjacent vehicle and the subject vehicle when the adjacent vehicle completes the lane change equals to or exceeds a predetermined distance threshold, or a fact that a relative velocity equals to or exceeds a predetermined adjacent vehicle speed threshold, as the safety condition.

3. The travel control device according to claim 1, wherein:
the acceptance determination portion is configured to use a fact that a relative velocity between the subject vehicle and a vehicle positioned over a moving space equals to or exceeds a predetermined front-and-back vehicle speed threshold as one of the acceptance condition.

4. The travel control device according to claim 1, wherein:
the acceptance determination portion is configured to estimate a request priority level of the lane change request from the adjacent vehicle; and
the acceptance determination portion is configured to use a fact that the estimated request priority level is high as one of the acceptance condition.

5. The travel control device according to claim 4, wherein
the acceptance determination portion is configured to estimate that the request priority level is high when any of following conditions exists:
a branching road exists ahead of the subject vehicle;
a restriction exists ahead in the adjacent lane; and
the adjacent lane ends ahead due to merging roads or a lane reduction.

6. The travel control device according to claim 1, further comprising:

a notification portion that is configured to notify of execution of the reception control, a driver of the subject vehicle, the adjacent vehicle, the vehicle traveling ahead of the subject vehicle, or the vehicle traveling behind the subject vehicle.

7. A travel control device that executes automated driving, comprising:
a processor connected to a memory,
wherein,
the processor is configured to:
determine a lane change request from an adjacent vehicle for a lane change to an own lane is detected when an illumination state of at least one of a directional indicator or a hazard light of the adjacent vehicle continues for a predetermined duration of time or longer;
determine, in response to a detection of the lane change request, whether a safety condition is met with regard to an expected relationship between the adjacent vehicle and a subject vehicle when the adjacent vehicle completes the lane change, the safety condition being predetermined to avoid causing both drivers of the adjacent vehicle and the subject vehicle to feel danger;
determine whether an acceptance condition is met, in response to that it is determined that the safety condition is hardly met, the acceptance condition at least including existence of an acceptance space between a vehicle traveling ahead of the subject vehicle or a vehicle traveling behind the subject vehicle and the subject vehicle;
generate a target motion for the subject vehicle to allow the lane change by the adjacent vehicle to satisfy the safety condition, in response to that it is determined that the acceptance condition is met; and
execute a reception control that is a travel control of the automated driving in accordance with the target motion generated,
wherein:
the subject vehicle is a vehicle equipped with the travel control device;
the own lane is a lane on which the subject vehicle is travelling;
the adjacent vehicle is a vehicle traveling on an adjacent lane that is a lane adjacent to the own lane; and
the acceptance space is a space necessary for executing the reception control without causing drivers of the vehicle traveling ahead, the vehicle traveling behind, and the subject vehicle to feel danger.

8. The travel control device according to claim 7, wherein:
the processor is configured to use at least one of a fact that an expected inter-vehicle distance between the adjacent vehicle and the subject vehicle when the adjacent vehicle completes the lane change equals to or exceeds a predetermined distance threshold, or a fact that a relative velocity equals to or exceeds a predetermined adjacent vehicle speed threshold, as the safety condition.

9. The travel control device according to claim 7, wherein:
the processor is configured to use a fact that a relative velocity between the subject vehicle and a vehicle positioned over a moving space equals to or exceeds a predetermined front-and-back vehicle speed threshold as one of the acceptance condition.

10. The travel control device according to claim 7, wherein:
the processor is configured to estimate a request priority level of the lane change request from the adjacent vehicle; and the processor is configured to use a fact that the estimated request priority level is high as one of the acceptance condition.

11. The travel control device according to claim 10, wherein
the processor is configured to estimate that the request priority level is high when any of following conditions exists:
a branching road exists ahead of the subject vehicle;
a restriction exists ahead in the adjacent lane; and
the adjacent lane ends ahead due to merging roads or a lane reduction.

12. The travel control device according to claim 7, further comprising:
the processor is configured to notify of execution of the reception control, a driver of the subject vehicle, the adjacent vehicle, the vehicle traveling ahead of the subject vehicle, or the vehicle traveling behind the subject vehicle.

\* \* \* \* \*